United States Patent [19]

Norkey et al.

[11] Patent Number: 5,139,228
[45] Date of Patent: Aug. 18, 1992

[54] FLUID CONNECTOR

[75] Inventors: Phillip J. Norkey, Jackson; Tom I. Letica, Rochester, both of Mich.

[73] Assignee: Huron Products, Inc., New Haven, Mich.

[21] Appl. No.: 717,279

[22] Filed: Jun. 18, 1991

Related U.S. Application Data

[60] Continuation-in-part of Ser. No. 690.667, Apr. 24, 1991, Pat No. 5,056,756, which is a division of Ser. No. 521,391, May 10, 1990, Pat. No. 5,054,743.

[51] Int. Cl.$^5$ ............................................. F16L 37/40
[52] U.S. Cl. ................................ 251/149.6; 285/321; 285/921
[58] Field of Search ..................... 251/149.6; 285/321, 285/921

[56] References Cited

U.S. PATENT DOCUMENTS

| | | | |
|---|---|---|---|
| 4,601,497 | 7/1986 | Bartholomew | 285/921 X |
| 4,819,908 | 4/1989 | Norkey | 251/149.6 |
| 4,834,423 | 5/1989 | DeLand | 285/921 X |
| 4,846,506 | 7/1989 | Bocson et al. | 285/921 X |
| 4,850,622 | 7/1989 | Suzuki | 285/321 X |
| 4,875,709 | 10/1989 | Caroll et al. | 285/921 X |
| 4,905,964 | 3/1990 | Shiozaki | 251/149.6 |
| 4,936,544 | 6/1990 | Bartholomew | 285/921 X |
| 4,943,091 | 7/1990 | Bartholomew | 285/921 X |

Primary Examiner—John Rivell
Attorney, Agent, or Firm—Lalos & Keegan

[57] ABSTRACT

A fluid connector generally comprising a housing having a longitudinal opening therethrough having at least one transversely disposed bearing, a conduit insertable in the longitudinal housing opening in a coupling position, the coupling having a fluid passageway communicating with the longitudinal housing opening and an annular flange spaced from the transverse bearing surface when the conduit is in the coupling position, means providing a seal between the housing and inserted conduit, a retainer disposed in the longitudinal housing opening including at least two leg sections, each of said leg sections having a support leg portion extending rearwardly and outwardly from the annular section, a transversely deflectable retaining leg portion disposed between the conduit annular flange and the housing and forming a continuation of the support leg portion at a first reverse bend, the retaining leg extending forwardly and inwardly toward the opening of the annular section, whereupon the retaining leg extends radially inwardly toward the outer surface of the conduit forming a lip portion engageable with the annular flange portion of the conduit, and means for selectively deflecting the retainer leg portion transversely to permit the removal of the conduit from the housing.

16 Claims, 4 Drawing Sheets

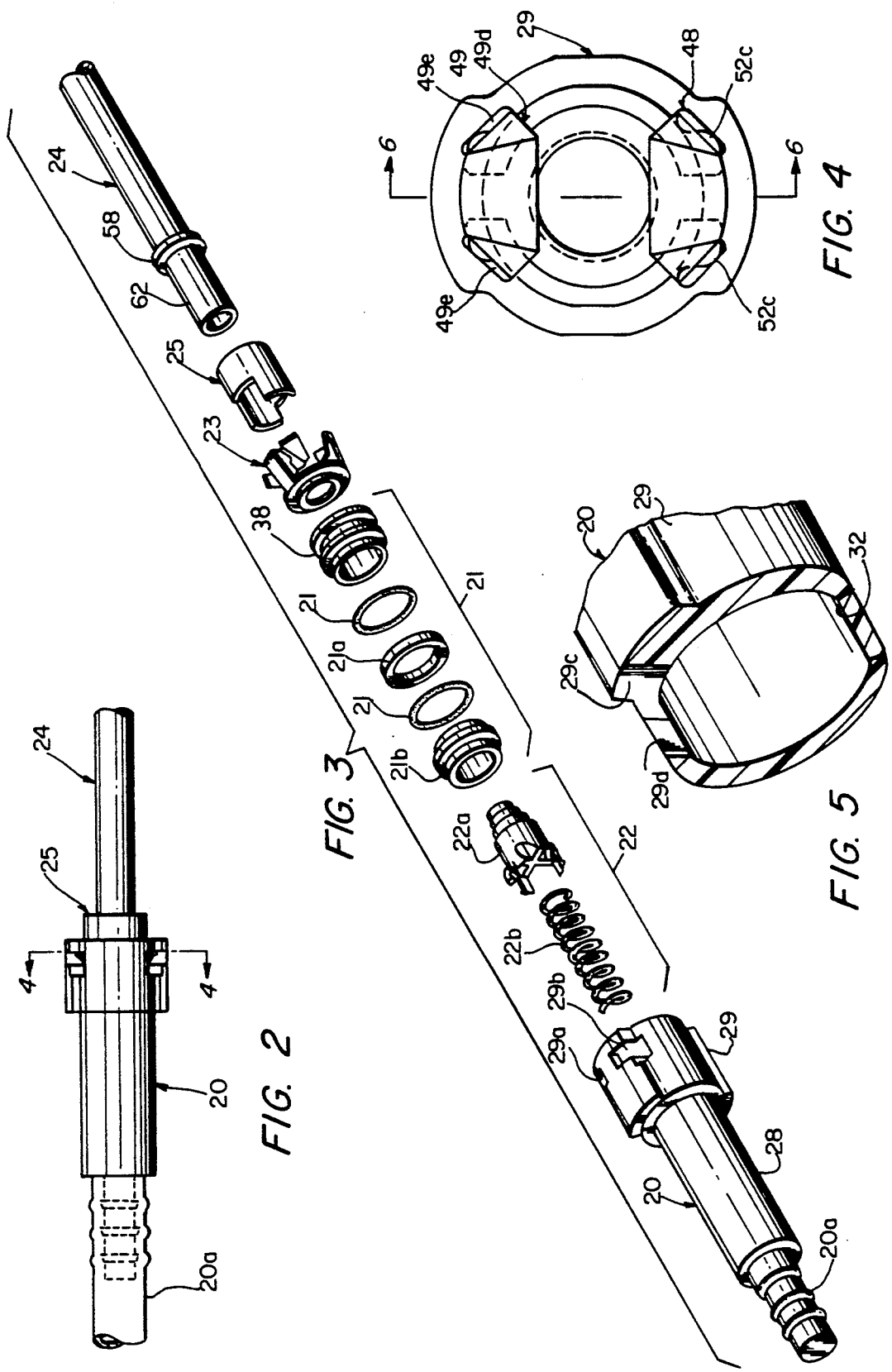

FLUID CONNECTOR

This application is a continuation-in-part of U.S. patent application, Ser. No. 07/690,667, filed Apr. 24, 1991, now U.S. Pat. No. 5,056,756 incorporated herein by reference, which is a divisional of U.S. patent application, Ser. No. 07/521,391, filed May 10, 1990, now U.S. Pat. No. 5,054,743, also incorporated herein by reference.

This invention relates to fluid connectors and more particularly to fluid connectors that are adapted to be quickly connected and disconnected. The invention further contemplates a fluid connector that is particularly suitable for use in automotive applications such as in fuel lines, air conditioning systems, power steering and brake systems.

In the prior art, there has been developed a type of quick connector that generally consists of a female housing, a male conduit insertable in the female housing in coupling relation therewith, sealing means disposed between the housing and the inserted conduit and means disposed in the housing for releasably retaining the conduit in coupling relation with the housing. Examples of such type of connector are illustrated and described in U.S. Pat. Nos. 4,819,908 and 4,846,506.

The male conduit member of such connectors typically is provided with an annular flange or bead which is disposed within the female housing member when the members are disposed in coupling relation, and the retainer means typically is interposed between the conduit annular flange and a forwardly facing bearing surface on the housing, usually an annular shoulder. When fluid under pressure is applied to the connector in the coupled condition, tending to eject the male conduit member from the female housing, the force applied to the male conduit member is transmitted through the conduit annular flange and the retainer engaging the bearing surface on the housing, to the housing.

An example of the prior art device heretofore described is partially shown in its normal operating position in FIGS. 1 and 8. A further illustration and description of such device is provided in the aforementioned patents, the disclosure of which is incorporated herein by reference. A male conduit 1 is shown having an annular flange 2, which has a substantially flat surface 3 and a curved surface 4. A retaining means 5 disposed in a housing 6 has a bend surface 7 interfacing male conduit 1 along a contact line 8 shown in FIG. 12. It has been found that if male conduit 1 is subjected to a severe torsional force, as denoted by arrow F, coupled with a severe axial force shown as A in FIG. 8, there exists the possibility that a leg 9 of the retaining means could be caused to ride up over the annular flange of the conduit and result in an inadvertent disconnection. Referring to FIG. 9, as male conduit 1 twists, retainer leg 9 may be caused to be displaced radially outwardly from its normal operating position in relation to the annular flange of the male conduit. This results in the line contact 8 becoming a point contact 10. In the extreme case, as seen in FIG. 10, when the axial force A is applied, retainer leg 9 may displace along a helical path 11 to the outer surface of the annular flange, whereupon the flange may be released from the retainer leg. It thus will be seen that this configuration could possibly lead to failure of the connector if these extreme conditions were found to exist in operation.

Accordingly, it is the principal object of the present invention to provide an improved fluid connector.

Another object of the present invention is to provide an improved fluid connector that is adapted to be quickly connected and disconnected.

A further object of the present invention is to provide an improved fluid connector which is capable of withstanding extreme torsional and axial loads.

A still further object of the present invention is to provide an improved retainer.

Another object of the present invention is to provide an improved retainer which will retain a male member in coupling relation with a female housing member notwithstanding the application of torsional forces to the male member.

Other objects and advantages of the present invention will become more apparent to those persons having ordinary skill in the art to which the present invention pertains from the following description taken in conjunction with the accompanying drawings wherein:

FIG. 2 is a side elevational view of a fluid connector embodying the present invention;

FIG. 3 is an explodes view of the fluid connector shown in FIG. 1;

FIG. 4 is an enlarged, cross-sectional view taken along line 4—4 in FIG. 2;

FIG. 5 is a partial, perspective view of the housing member shown in FIGS. 2 through 4;

Figure 1:
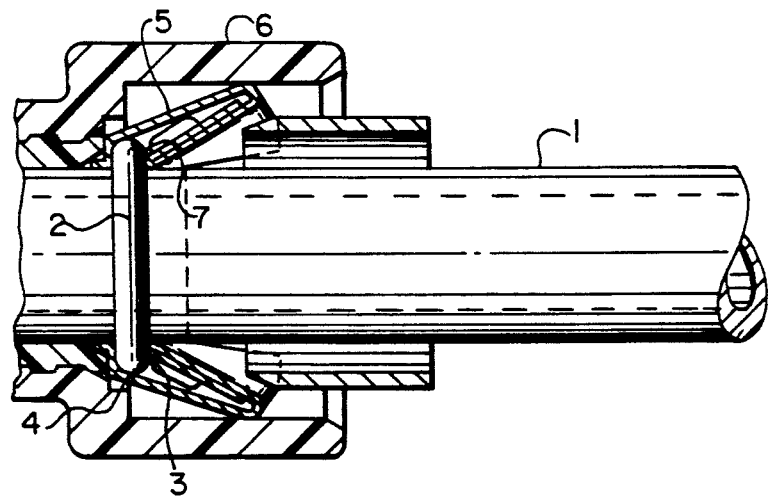
FIG. 1 is a cross-sectional view of the prior art embodiment.

Referring to the drawings, and in particular to FIGS. 2 through 11, there is illustrated an embodiment of the invention which generally includes a female housing member 20, a sealing assembly 21 disposed in the housing member, a valve assembly 22 disposed in the housing assembly between the housing and the sealing assembly, a retainer member 23 disposed within the housing member, a male conduit member 24 insertable in the housing member in coupling relationship therewith and a release member 25 partially extending into the housing member and cooperable with the retainer member for releasing the conduit member from the housing member.

Figure 6:
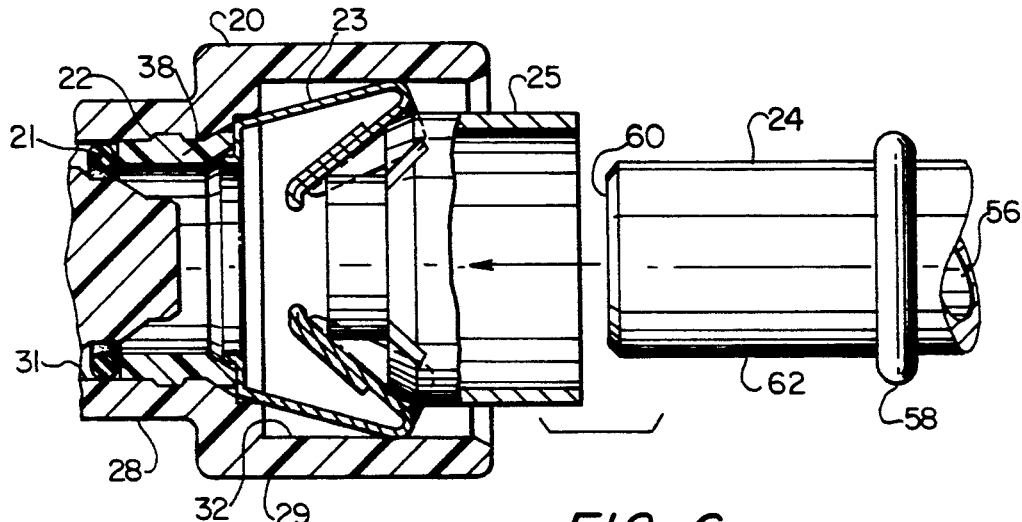
FIG. 6 is a cross-sectional view of an embodiment of the present invention, illustrating the female housing and male conduit members thereof in an uncoupled relationship.

As best shown in FIG. 2, the housing member includes a reduced end section 20a adapted to be received within and secured to a flexible fluid line, an intermediate section 28 housing the valve and sealing assemblies and an enlarged end section 29 housing the retainer and release members. Internally, as best shown in FIGS. 5 and 6, the housing member is provided with a longitudinal passageway having a first enlarged section 31 having a substantially circular cross-sectional configuration and a second enlarged section 32 having a substantially oblong cross-sectional configuration.

The housing member may be formed by injection molding from any suitable material depending upon the use of the connector. As shown in FIGS. 2 through 5, enlarged section 29 of the housing member is provided with a pair of transversely disposed slots 29a and 29b which are disposed on opposite sides of the longitudinal axis of the housing member, intersect enlarged section 29 and provide a plurality of circumferentially spaced bearing surfaces 29c lying in a plane disposed perpendicular to the longitudinal axis of the housing member. For automotive fuel line applications, the material used should be highly heat resistant and highly chemical resistant. Preferably, for such uses, the housing member is formed of a polyphenol sulfide material manufactured by the Phillips 66 Company of Bartlesville, Oklahoma and sold under the trademark RYTON.

Figure 7:
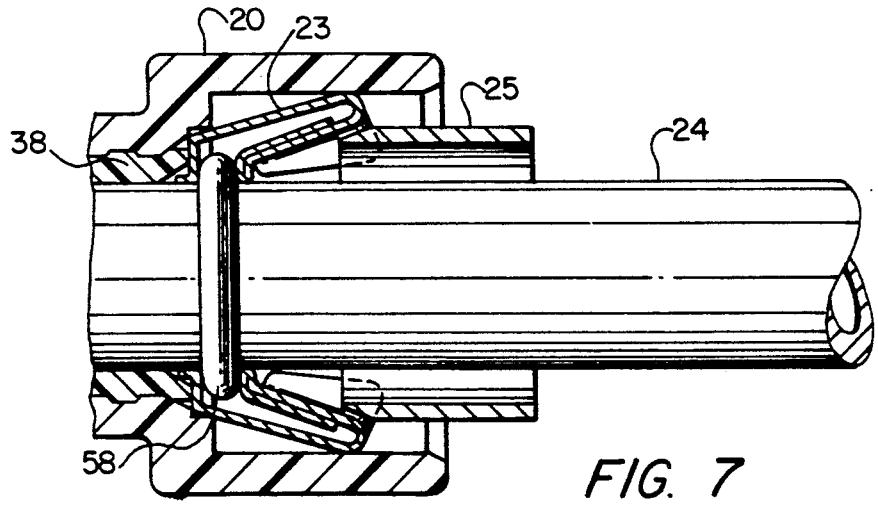
FIG. 7 is a view similar to the view shown in FIG. 6 illustrating the female housing and male conduit members in coupling relationship.
Figure 8:
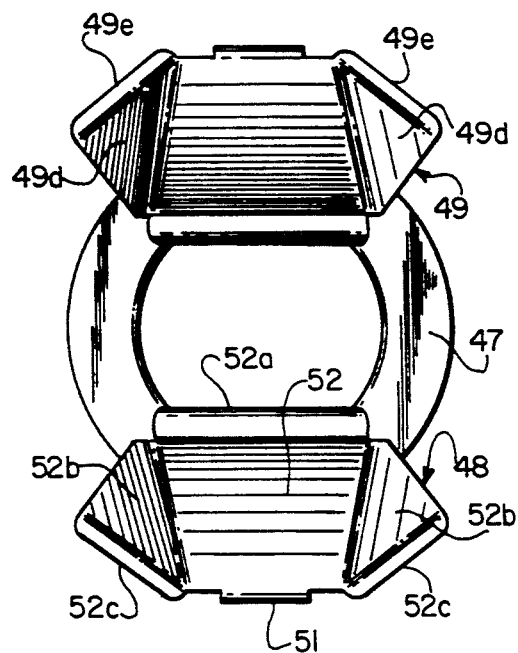
FIG. 8 is a rear elevational view of the retainer member shown in FIGS. 6 and 7.
Figure 9:
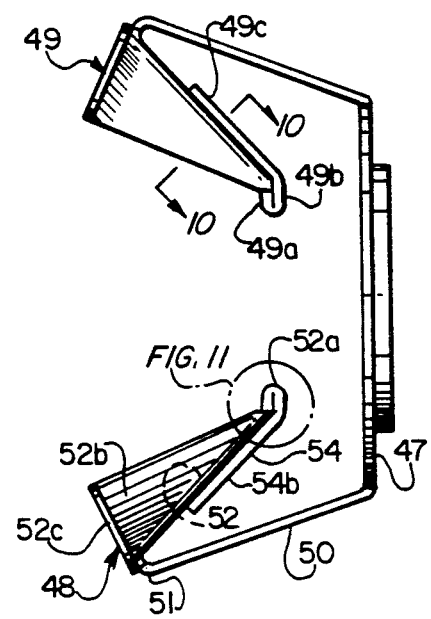
FIG. 9 is a side elevational view of the retainer member shown in FIG. 8.
Figure 10:
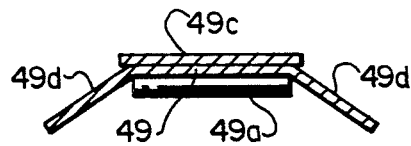
FIG. 10 is a cross-sectional view taken along line 10—10 in FIG. 5.
Figure 11:
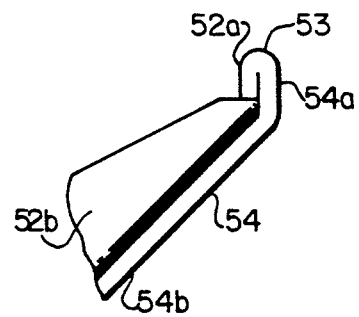
FIG. 11 is an enlarged detail view of the retainer member shown in of FIG. 9.
Figure 12:
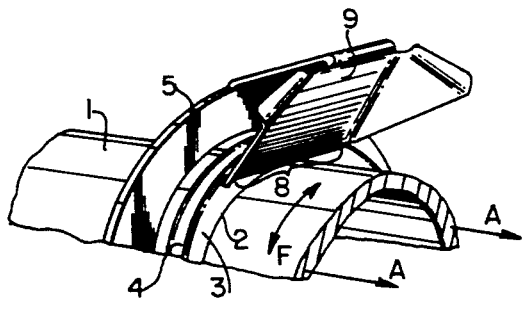
FIG. 12 is a perspective view illustrating a retainer and male conduit of a prior art embodiment in its normal operating position.

FIGS. 8 through 11 best illustrate the retainer member which includes an annular section 47 and a pair of identical leg sections 48 and 49. Annular section 47 has an outer diameter sufficient to enable the retainer member to engage the rear end of a bushing 38 as shown in FIGS. 3 and 6 and an inner diameter sufficient to permit a leading end portion 62 of the conduit member to be received therethrough as shown in FIG. 7. Leg section 48 includes support leg portion 50 extending axially and radially relative to the longitudinal axis of annular section 47 from the annular section and terminating in a first reverse bend 51, a deflectable retaining leg portion 52 extending radially and axially from first reverse bend 51 toward the opening in the annular section whereupon the retaining leg portion extends radially inwardly toward the longitudinal centerline of the retainer to form a lip portion 52a and terminating in a second reverse bend 53, and a fold-back portion 54 having a lip portion 54a and a leg portion 54b. Lip portions 52a and 54b and similar lip portions 49a and 49b of leg 49 are situated substantially parallel to the conduit annular flange and are displaced in substantially the same plane which is perpendicular to the longitudinal centerline of the retainer.

Retaining leg portion 52 is provided with laterally projecting wing portions 52b which in turn are provided with pad portions 52c formed along the rear edges thereof. Similarly, retaining leg 49 having a fold-back portion 49c is provided with laterally projecting wing portions 49d having pad portions 49e along the rear edges thereof. Pad portions 52c of leg section 48 and pad portions 49e of leg section 49 are circumferentially spaced relative to the longitudinal axis of annular section 47 and are adapted to engage circumferentially spaced transverse bearing surfaces of housing 20 formed by the transverse slots when the retainer member is disposed in enlarged section 32 of the housing member as shown in FIGS. 2 and 3. Typically, the retainer members are formed by stamping suitably configured blanks from metal sheet materials and bending the blanks to form the leg sections as described. Preferably, and particularly for applications where the fluid with which the connector is used is corrosive, the retainer members are formed of stainless steel.

Conduit member 24 is tubular providing a fluid passageway 56. It includes an annular flange or bead portion 58 spaced from a leading end 60 thereof, and leading end portion 62 disposed between the leading end thereof and annular flange portion 58. As best shown in FIG. 7, leading end portion 62 has an outside diameter substantially equal to the outside diameter of valve assembly 22 so that when the leading end portion of the conduit member is fully inserted into the housing to displace valve member 22a against the action of spring 23b, annular flange portion 58 thereof engages annular section 47 of the retainer member to provide a fluid tight seal between the conduit and housing member.

As the conduit member is inserted into the housing member in such manner, the engagement of annular flange portion 58 of the conduit member will displace the retainer leg portions of the retainer member radially outwardly to permit the annular flange portion to displace past the retaining leg portions of the retainer into engagement with the annular section of the retainer member. Once the annular flange portion advances beyond the retainer leg portions of the retainer member, the retainer leg portions snap back radially inwardly behind the annular flange portion of the conduit member to obstruct the rearward displacement of the conduit member and thus secure the conduit member in coupling relationship with the housing member as shown in FIG. 7. The conduit member may be formed from any suitable metal or plastic material having sufficient strength characteristics and the annular flange portion of the conduit similarly may be formed by any suitable method.

The connector as described is assembled by first inserting the valve and sealing assemblies mounted on a tool as a single assembly in the enlarged end of the housing member. The retainer member is then positioned in enlarged section 32 so that the annular section thereof engages or is seated on bushing 38. The release member is then inserted into the housing member, whereupon the female member of the connector is then fully assembled for application to a fuel line. The female member may be connected to a fuel line simply by inserting the reduced end section thereof in the fluid line in the conventional manner.

When it is desired to connect the male member to the female member connected to the fluid line under pressure, the conduit member simply is inserted through the release member into enlarged section 32 of the housing member so that the annular flange portion thereof engages the retaining leg portions of the retainer member to deflect them radially outwardly and permit the annular flange portion to pass between the retaining leg portions into engagement with the annular section of the retainer member. The conduit member will then be in coupling relation with the housing member as shown in FIG. 7. Whenever it is desired to disconnect the connector, the housing member may be grasped firmly in one hand and the release member is displaced forwardly with the fingers of the other hand so that the retaining leg portions will be displaced radially outwardly to permit the conduit member to be withdrawn from the housing member. With the retaining leg portions deflected radially outwardly, the annular flange portion of the conduit member is free to pass unobstructed past the retainer member to be withdrawn from the housing member.

With the connector in the coupled condition as shown in FIG. 3 and fluid pressure being applied to the fluid line, the force of the fluid acts on the conduit member tending to eject it from the housing member. The force applied to the conduit member is transferred through the annular flange of the conduit member, the retaining leg portions, the wing portions formed on the retaining leg portions and the pad portions formed on the rear ends of the wing portions engaging housing bearing surfaces, to the housing member. In this regard, it is to be noted that reverse bend portions 51 of the retainer leg sections are out of longitudinal alignment with any portion of the housing member so that none of the load applied to the retainer member is transmitted from the retainer member to the housing member through either of bend portions 51 which are subject to fatigue failure. All of the load transmitted through the retainer member is transferred to the housing member exclusively through the pad portions of the retainer member which engage housing transverse bearing surfaces 29c and provide bearing surfaces of a greater area for a better distribution of the load being transmitted.

Figure 13:
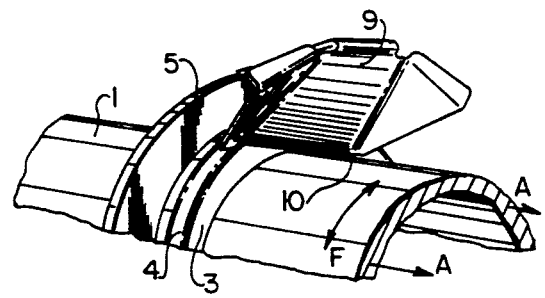
FIG. 13 is a perspective view of the prior art embodiment of FIG. 12 in an intermediate operating condition after torsional and axial forces have been applied.
Figure 14:
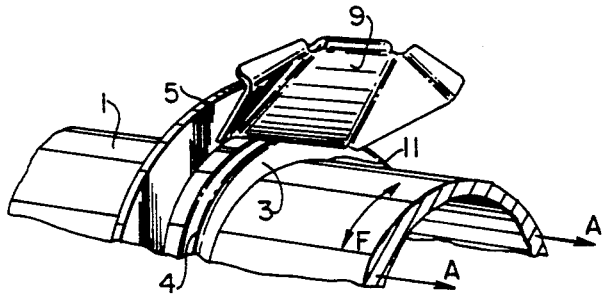
FIG. 14 is a perspective view of the prior art embodiment of FIG. 13 after torsional and axial forces have been applied.
Figure 15:
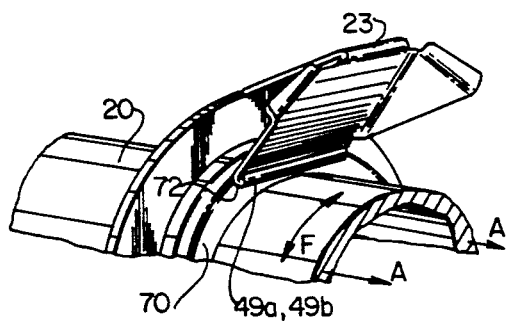
FIG. 15 is a perspective view of an embodiment of the present invention in its normal operating condition.
Figure 16:
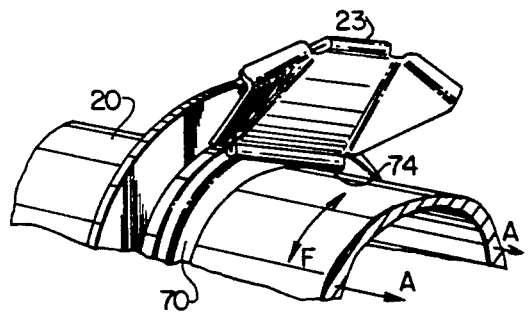
FIG. 16 is a perspective view of an embodiment of the present invention after a torsional force has been applied.

It will be appreciated that the provision of lip portions 52a, 54a, 49a and 49b prevents the possibility of the male conduit being released when subject to severe torsional forces. As shown in FIG. 15, depicting the embodiment of the present invention in its normal operating mode, the lip portions, being substantially parallel to the flat portion 70 of the annular flange of the male conduit member, provide a surface contact 72 between the lip portions and the annular flange. That is to say, the entire outer surface area of lip portion 49b contacts the flat portion 70 of the annular flange to form the surface contact area 72. As shown in FIG. 16, the application of the torsional force will again cause the retainer leg to displace radially outwardly from its normal operating position in relation to the annular flange of the male conduit. However, unlike the prior art embodiment in which the displacing action results in a point contact 10 (in FIG. 13), the retainer leg of the present invention even when displaced radially outwardly will nonetheless remain in contact with the annular flange along a line contact 74. This line contact is sufficient to resist the helical movement of the retaining leg in reference to the annular flange. As a result, the retaining leg will not be caused to ride up and over the annular flange of the conduit, and the inadvertent disconnection of the conduit is avoided.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A fluid connector comprising:
   a housing having a longitudinal opening therethrough, said housing having at least one transversely disposed bearing surface;
   a conduit having a leading end portion insertable in said longitudinal housing opening in a coupling position, said conduit having a fluid passageway communicating with said longitudinal housing opening and an annular flange disposed within said longitudinal housing opening and spaced from said transverse bearing surface when said conduit leading end portion is in said coupling position;
   means providing a seal between said housing and said conduit when said conduit leading end portion is in said coupling position;
   means disposed in said longitudinal housing opening for releasably retaining said conduit leading end portion in said coupling position, said retaining means including an annular section which engages an annular interior wall of said longitudinal housing opening, at least two leg sections, each of said leg section having a support leg portion extending rearwardly and outwardly from said annular section, a transversely deflectable retaining leg portion disposed between said conduit annular flange and said housing and forming a continuation of said support leg portion at a first reverse bend, said retaining legs extending forwardly and inwardly toward the opening of said annular section, whereupon said retaining legs extend radially inwardly toward the outer surface of said conduit forming a lip portion engageable with said annular flange portion of said conduit, each of said retaining leg portions having at least one pad portion engageable with said transverse bearing surface whereby upon application of fluid pressure to said connector tending to eject said conduit from its coupling position in said housing, the force exerted thereby is caused to be transmitted through said conduit annular flange, said retaining leg portions and the pad portions thereof engaging said transverse bearing surface of said housing; and
   means for selectively deflecting said retainer leg portions transversely to permit the removal of said conduit from said housing.

2. A fluid connector according to claim 1, wherein said each of said retaining leg portions of said retaining means includes a fold-back portion forming a continuation of said retaining leg, said fold-back portion having a lip portion and a leg portion, said fold-back lip portion and said retaining leg lip portion forming a second reverse bend portion, said lip portions being aligned substantially parallel to said conduit annular flange.

3. A fluid connector according to claim 1, wherein each of said retaining leg portions is engaged by said conduit annular flange when said conduit leading end portion is in said coupling position and receives said conduit leading end portion therethrough.

4. A fluid connector according to claim 1, wherein said first reverse bend portion is disposed out of longitudinal alignment with any adjacent portion of said housing whereby upon application of fluid pressure to said connector tending to eject said conduit from its coupling position in said housing, no force exerted thereby shall be transmitted through said first reverse bend portion to said housing.

5. A fluid connector according to claim 1, wherein said longitudinal housing opening has an end section provided with a substantially oblong cross-sectional configuration, said housing is provided with a pair of transverse openings therein disposed on opposite sides of a longitudinal axis of said housing and intersecting said end section of said longitudinal housing opening to provide circumferentially spaced, transversely disposed bearing surfaces on said housing, said retaining means including two legs providing pad portions engaging said transverse bearing surfaces and said first reverse bend portions between said support and retaining leg portions being disposed out of longitudinal alignment with said housing.

6. A fluid connector according to claim 1 wherein each of said retaining leg portions include at least one radially projecting wing portion and said pad portion is disposed on said wing portion.

7. A fluid connector according to claim 1 wherein said housing is formed of a plastic material.

8. A fluid connector according to claim 1 wherein said housing is formed of a material that is highly heat and chemical resistant.

9. A fluid connector according to claim 1 wherein said housing is formed of polyphenol sulfide.

10. A fluid connector according to claim 1 wherein said retaining means is formed of stainless steel.

11. A retaining means for use in a fluid connector having a housing having a longitudinal opening therethrough, said housing having at least one transversely disposed bearing surface, a conduit having a leading end portion insertable in said longitudinal housing opening in a coupling position, said conduit having a fluid passageway communicating with said longitudinal housing opening and an annular flange disposed within said longitudinal housing opening and spaced from said transverse bearing surface when said conduit leading end portion is in said coupling position, and means providing a seal between said housing and said conduit when said conduit leading end portion is in said coupling position, said retaining means comprising:

an annular section which engages an annular interior wall of said longitudinal housing opening;

at least two leg sections each having a support leg portion extending rearwardly and outwardly from said annular section; and a transversely deflectable retaining leg portion disposed between said conduit annular flange and said housing and forming a continuation of said support leg portion at a first reverse bend;

said retaining leg extending forwardly and inwardly toward the opening of said annular section, whereupon said retaining leg extends radially inwardly toward the outer surface of said conduit forming a lip portion engageable with said annular flange portion of said conduit, said retaining leg portion having at least one pad portion engageable with said transverse bearing surface whereby upon application of fluid pressure to said connector tending to eject said conduit from its coupling position in said housing, the force exerted thereby is caused to be transmitted through said conduit annular flange, said retaining leg portion and the pad portion thereof engaging said transverse bearing surface of said housing;

said retaining means being disposed in said longitudinal housing opening for releasably retaining said conduit leading end portion in said coupling position.

12. A retaining means according to claim 11, wherein said retaining means includes a fold-back portion forming a continuation of said retaining leg portion, said fold-back portion having a lip portion and a leg portion, said fold-back lip portion and said retaining leg lip portion forming a second reverse bend portion, said lip portions being aligned substantially parallel to said conduit annular flange.

13. A retaining means according to claim 11, wherein said retaining leg portion is engaged by said conduit annular flange when said conduit leading end portion is in said coupling position and receives said conduit leading end portion therethrough.

14. A retaining means according to claim 11, wherein said first reverse bend portion is disposed out of longitudinal alignment with any adjacent portion of said housing whereby upon application of fluid pressure to said connector tending to eject said conduit from its coupling position in said housing, no force exerted thereby shall be transmitted through said first reverse bend portion to said housing.

15. A retaining means according to claim 11, wherein said longitudinal housing opening has an end section provided with a substantially oblong cross-sectional configuration, said housing is provided with a pair of transverse openings therein disposed on opposite sides of a longitudinal axis of said housing and intersecting said end section of said longitudinal housing opening to provide circumferentially spaced, transversely disposed bearing surfaces on said housing, said retaining means includes two legs providing pad portions engaging said transverse bearing surfaces and said reverse second bend portions between said support and retaining leg portions are disposed out of longitudinal alignment with said housing.

16. A retaining means according to claim 11 wherein said retaining leg portion includes at least one radially projecting wing portion and said pad portion is disposed on said wing portion.

* * * * *